United States Patent [19]

Matsuura et al.

[11] Patent Number: 5,528,728
[45] Date of Patent: Jun. 18, 1996

[54] SPEAKER INDEPENDENT SPEECH RECOGNITION SYSTEM AND METHOD USING NEURAL NETWORK AND DTW MATCHING TECHNIQUE

[75] Inventors: Yoshihiro Matsuura, Funabashi, Japan; Toby Skinner, Beaverton, Oreg.

[73] Assignees: Kabushiki Kaisha Meidensha, Tokyo, Japan; Adaptive Solutions, Inc., Beaverton, Oreg.

[21] Appl. No.: 89,825

[22] Filed: Jul. 12, 1993

[51] Int. Cl.$^6$ ................. G01L 5/06; G01L 9/00
[52] U.S. Cl. ................. 395/2.41; 395/2.63
[58] Field of Search ................. 395/2, 2.6, 2.4, 395/2.41, 2.3, 2.61, 2.63, 2.5; 381/43

[56] References Cited

U.S. PATENT DOCUMENTS

| | | | |
|---|---|---|---|
| 4,637,045 | 1/1987 | Noso et al. | 381/43 |
| 4,799,261 | 1/1989 | Lin et al. | 381/36 |
| 5,228,087 | 7/1993 | Bickerton | 381/43 |

OTHER PUBLICATIONS

Continuous Speech Recognition Using Linked predictive neural Networks Tebelskis et al, IEEE 14–17 May 1991.
Phoneme base Word Recognition by NN:—Hirai et al., IEEE 17–21 June 1990.
Speech Recognition Using Dynamic NN Botros et al., IEEE 7–11 Jun. 1992.
Multiple NN Topologies applied to Keyword spotting Morgan et al., IEEE/14–17 May 1991.
Robust Speech Parameters Extraction for Word Recognition in Noise Using NN Barbier et al., IEEE 14–17 May 1991.
Dayhoff, *Neural Network Architectures*, Chapter 5, 1990.
Takami et al, "Phoneme Recognition by Pairwise Discriminant TDNNs", *ATR Interpreting Telephony Research Laboratories*, vol. 16:677–680.

Ryohei Nakatsu, A Japanese Paper of Information Processing vol. 24, No. 8, (Yokoshuki Electrical Communication Laboratory), pp. 984–992, 1983.
Japanese book entitled "Pattern Recognition", Published by a Japanese society of electronic, information, and communication on Apr. 26, 1993, pp. 116–123.
Lynn et al, "Introductory Digital Signal Processing With Computer Applications", *The Fourier Transform Method*, pp. 148–157, (1992).
Lynn et al, "Introductory Digital Signal Processing With Computer Applications", *FFT Processing*, pp. 251–283, (1992).

*Primary Examiner*—Allen R. MacDonald
*Assistant Examiner*—Richemond Dorvil
*Attorney, Agent, or Firm*—Foley & Lardner

[57] ABSTRACT

Improved speaker independent speech recognition system and method are disclosed in which an utterance by an unspecified person into an electrical signal is input through a device such as a telephone, the electrical signal from the input telephone converting the electrical signal into a time series of characteristic multidimensional vectors, the time series of characteristic multidimensional vectors are received, each of the vectors being converted into a plurality of candidates so that the plurality of phonemes constitutes a plurality of strings of phonemes in time series as a plurality of candidates, the plurality of candidates of phonemes are compared simultaneously (one at a time) with a reference pattern of a reference string of phonemes for each word previously stored in a dictionary to determine which string of phonemes derived from the phoneme recognition means has a highest similarity to one of the reference strings of the phonemes for the respective words stored in the dictionary using a predetermined word matching technique, and at least one candidate of the words as a result of word recognition on the basis of one of the plurality of the strings of phonemes which has the highest similarity to the corresponding one of the reference strings of the respective words is output as the result of speech recognition.

11 Claims, 3 Drawing Sheets

```
A:   a   a   a   a   b   b   b   c   c   c   c
     |   |    \   |   |
B:   a   a   0   a   b   b   ■   ■   c   c   c
```

$A = \min(B, C, D) + dA$

SPEAKER INDEPENDENT SPEECH RECOGNITION SYSTEM AND METHOD USING NEURAL NETWORK AND DTW MATCHING TECHNIQUE

BACKGROUND OF THE INVENTION (1) Field of the Invention

The present invention relates to improved system and method for recognizing an isolated speech uttered by any speaker unspecified using a NN (Neural Network) and/or DP (Dynamic Programming) matching (or called DTW (Dynamic Time Warping)) technique with a higher rate of speech recognition. This system and method can be applied to every speech data based control apparatus.

(2) Description of the Background Art

A Japanese Paper of Information Processing Volume 24 No. 8 published in Japan on August, 1983 by Ryohei NAKATSU (Yokoshuka Electrical Communication Laboratory) exemplifies a previously proposed speech Recognition Technology.

U.S. Pat. No. 4,637,045 exemplify one of the control apparatuses to which the speech recognition system is applied.

SUMMARY OF THE INVENTION

It is an objective of the present invention to provide an improved speaker independent speech recognition system and method which can more accurately recognize a word utterance using a special technique such as NNs and DTW.

The above-described object can be achieved by providing an apparatus comprising: a) input means for inputting an utterance by an unspecified person into an electrical signal; b) characteristic extracting means for receiving the electrical signal from the input means and converting the electrical signal into a time series of characteristic multidimensional vectors; c) phoneme recognition means for receiving the time series of discrete characteristic multidimensional vectors and converting each of said vectors into a plurality of candidates of phonemes from a first order to an n-th order (n denotes an arbitrary number); d) word recognition means for receiving a time series strings of phonemes from the phoneme recognition means and comparing the plurality of candidates of phonemes, one at a time, with each phoneme of a reference string of phonemes for each word previously stored in a dictionary until a final phoneme of the reference string of phonemes for a last word of the words stored in the dictionary and determining which time series of phonemes derived from said phoneme recognition means has a totally highest similarity to one of the reference strings of the phonemes for the respective words stored in the dictionary using a predetermined word matching technique; and e) output means for outputting at least one word candidate as a result of word recognition carried out by the word recognition means on the basis of the similarity determination on the plurality of candidates of phonemes with respect to the reference strings of the words stored in said dictionary.

The above-described object can also be achieved by providing a method of speaker independent speech recognition comprising the steps of: a) inputting an utterance by an unspecified person into an electrical signal; b) receiving the electrical signal from the input means and converting the electrical signal into a time series of discrete characteristic multidimensional vectors; c) receiving the time series of discrete characteristic multidimensional vectors and converting each of said vectors into a plurality of candidates of phonemes from a first order to an n-th order (n denotes an arbitrary number); d) receiving a time series strings of phonemes derived at said step c) and comparing the plurality of candidates of phonemes, one at a time, with each phoneme of a reference string of phonemes for each word previously stored in a dictionary until a final phoneme of the reference string of phonemes for a last word of the words stored in the dictionary and determining which time series of phonemes derived at said step c) has a totally highest similarity to one of the reference strings of the phonemes for the respective words stored in the dictionary using a predetermined word matching technique; and e) outputting at least one word candidate as a result of word recognition carried out at said step d) on the basis of the similarity determination on the plurality of candidates of phonemes with respect to the reference strings of the words stored in said dictionary,

DETAILED DESCRIPTION OF THE PREFERRED EMBODIMENTS

Reference will hereinafter be made to the drawings in order to facilitate a better understanding of the present invention.

First Embodiment

Figure 1:
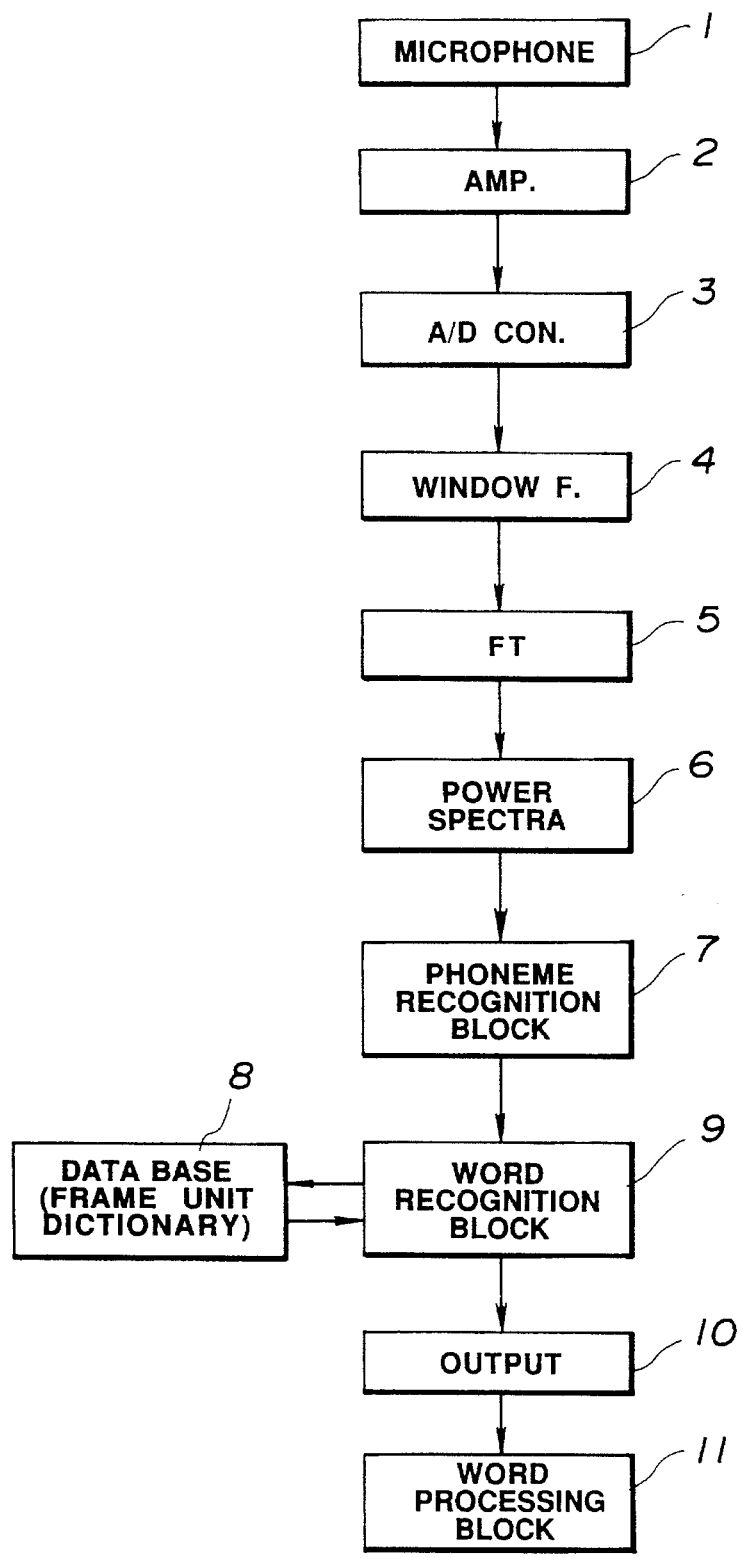
FIG. 1 is a circuit block diagram of a speech recognition system in a first preferred embodiment according to the present invention.

FIG. 1 shows a first preferred embodiment of a speech recognition system according to the present invention.

As shown in FIG. 1, a microphone 1 is provided for picking up and transducing an utterance spoken by an unspecified person into an electrical signal.

An amplifier 2 is provided to amplify the transduced electrical signal to a normal audible level.

In the first preferred embodiment according to the present invention, a telephone unit constitutes the microphone 1 and amplifier 2.

An A/D converter 3 is provided to sample and convert the analog amplified signal into a corresponding digital signal.

A window function generator 4 is provided to divide or segment the digital signal from the A/D converter 3 into each frame signal (a frame width being, e.g., 16 ms and frame shift width being, e.g., 12 ms) in a time series using a window function such as Hamming window of a kind of digital filters.

It is noted that the Hamming window is exemplified at pages 149 to 153 of an English publication titled "Introductory Digital Signal Processing with Computer Applications" published by Paul A. Lynn and Wolfgang Fuerst and reprinted on January 1992 (the disclosure of which is herein incorporated by reference).

Next, the frame expressed digital signal from the window function generator 4 is transmitted to an FT (Fourier Transform) analyzer 5.

The function and construction of the FT analyzer 5 is exemplified in chapter 8 of FFT (Fast Fourier Transform) processing of the English publication titled "Introductory Digital Signal Processing with Computer Applications" published by Paul A. Lynn and Wolfgang Fuerst and reprinted on January 1992 (the disclosure of which is herein incorporated by reference).

That is to say, in the FT analyzer 5, the frame expressed signal is converted into each segment representing a power spectrum with respect to its frequency and which can represent characteristic of a series of phonemes constituting the utterance spoken by the unspecified person. It is noted that the term of "frame" means one of a series of characteristic vectors derived from, e.g., the FT analyzer 5 which calculates and analyzes respective channels over the very short time intervals, e.g., over 8 to 20 milliseconds (ms).

A phoneme recognition block 7 receives a speech data sequentially, i.e., a string of discrete power spectra signals in a time series constituting the isolated utterance from the power spectra block 6 and recognizes it as a string of phonemes such as zzzeeeerroooo.

It is herein noted that, in a previously proposed technique of speech recognition, using the string of phonemes recognized in the phoneme recognition block, a comparison between the string of phonemes recognized in the phoneme recognition block and a string of phonemes constituting each word and stored in a dictionary (data base) previously storing strings of phonemes of words to be recognized is made in a word recognition block and thereafter when the compared result indicates a highest similarity, the word corresponding to the string of phonemes having the highest similarity in an encoded form.

In detail, the phoneme recognition block recognizes to which phoneme the input data corresponds from a characteristic of input speech data derived from a microphone 1 to power spectra block in a very short period of time, the input speech data being cut out from input speech signal of the microphone for each short interval of time determined by the window function generator.

Consequently, the phoneme recognition block can recognize which phoneme corresponds to the input speech data for each short interval of time (frame expression such as zzzeeerroooo).

Next, a compression block, located at the subsequent stage of the phoneme recognition block, serves to compress one string of phonemes into a normal string of phonemes so as to finally provide a segment expression of word such as zzzeeeerroooo→zero. It is noted that a technique such as a back propagation learning parallel run type of Neural Networks to be described in the second embodiment or Pairwise Discriminant Time Delay NNs (PD-TDNNs) may be applicable to the phoneme recognition block.

Now referring back to the previously proposed speech recognition system described above, the subsequent stage of the word recognition block receives the derived string of phonemes from the phoneme recognition block and compares it with the string of phonemes for each word stored in the dictionary to output the word whose string of the phonemes has the highest similarity to the derived string of phonemes as the answer of the word recognition block in the encoded form.

At this time, with a rate of recognition at the phoneme recognition block generally rarely or never being 100%, the word recognition block takes a matching technique even if the phoneme recognition block provides the string of phoneme having at least one erroneous phoneme.

This matching technique will be described below.

Figures 2, 3:
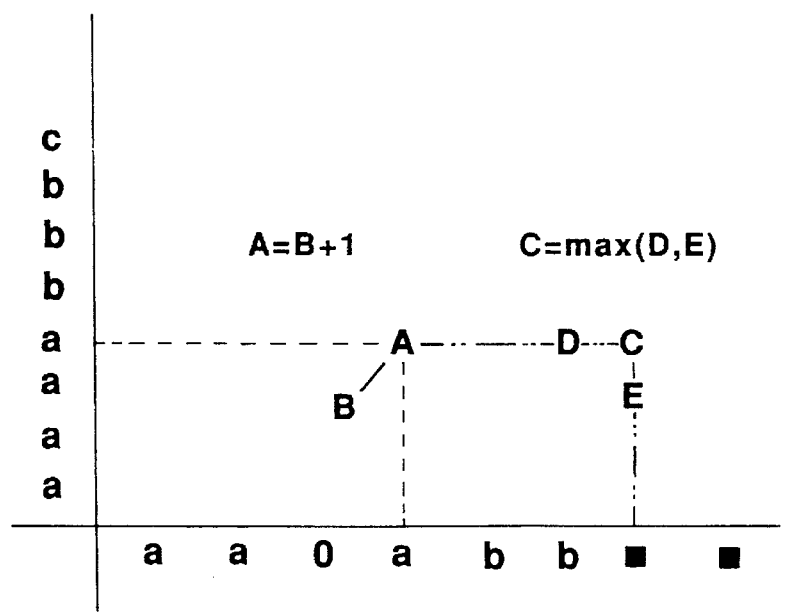
FIG. 2 is an example for explaining a phoneme recognition carried out in either a previously proposed word recognition block or word recognition block shown in FIG. 1.
FIG. 3 is an example of comparison between strings of phonemes for explaining a matching method carried e out in the word recognition block shown in FIG. 1.

As a basic algorithm carried out in the word recognition block of the previously proposed speech recognition system, for example, when the word recognition block compares two strings of alphabets A and B as shown in FIG. 2, equal alphabets of the strings of alphabets A and B are linked together with a branch. Suppose that a maximum number of branches which satisfy the following requirements; (1) the two branches do not intersect with each other; (2) only one branch can be drawn from one alphabet, be N and a length of each string of alphabets A and B be LA and LB, a similarity between the strings of alphabets A and B is given as: N/LA+N/LB.

In an actual algorithm based on the above-described basic algorithm, when the number of branches are derived, the two strings of alphabets $A[i]:i=1$ and $B[j]:j=1, J$ are arranged on both coordinate axes of a two dimensional coordinate matrices $S[i][j]$, as shown in FIG. 3. Thereafter, $S[I][J]$ is the number of branches to be derived when S is satisfied in accordance with the following equation.

$$\text{if } A[i]=B[j] S[i][j]=S[i-1][j-1]+1$$

else $$S[i][j]=\max(S[i-1][j], S[i][j-1]),$$

wherein max(a, b) denotes either a or b which indicates a larger value from both a and b.

This technique permits the comparison between the two strings of phonemes in which an omission of phonemes, erroneous insertion of phonemes, and/or conversion error is included.

In addition, according to the result of comparison by means of the above-described technique, the word recognition block compares both strings of the phonemes derived from the dictionary and derived from the phoneme recognition block with respect to the input speech data and outputs the highest similarity string of phonemes therefrom to have been compared with each string of phonemes stored in the dictionary as the result of speech recognition.

A problem, however, occurs in the previously proposed technique described above. That is to say, although the compression block described above is provided to serve to convert the frame expressed string of phonemes into the segment expressed string of phonemes, an accuracy of the conversion becomes deteriorated.

Basically, i.e., the compression block (1) eliminates an erroneously recognized string of phonemes which provides only small number of continuous phonemes from the continuous strings of phonemes and (2) segments (compresses) the continuous strings of phonemes to express a single string of phonemes. However, in this case, some of consonants have extremely short length of continued time duration. It is difficult to distinguish the consonants from the erroneously recognized phonemes according to only the continuous number of frames and, thus, it is unavoidably necessary to store and retrieve linguistic information (e.g., syntax) and so on.

Furthermore, since the output of the phoneme (phonemic) recognition block is limited only to a candidate of first order, the effect of erroneous recognition becomes large on a boundary between the phonemes in which the recognition of a single phoneme is easy to become ambiguous.

Referring now back to the first preferred embodiment of the speech recognition system shown in FIG. 1, the compression block is eliminated and the phoneme recognition block 7 outputs a plurality of strings of phonemes recognized, i.e., a plurality of candidates of the strings of phonemes from a first order to n-th order as the result of phoneme recognition from the time-series discrete frame expressed power spectra such as a first order: zzzeeeerroooo, a second order: -ssalaoadaauu, third order: ---, and so forth.

Then, the word recognition block 9 receives each candidate of phonemes constituting the strings of phonemes from the first order to the n (n denotes an arbitrary number) order simultaneously from the phoneme recognition block 7 and retrieves and compares the plurality of phoneme reference strings constituting each word from the frame unit dictionary 8 using the same technique as described above.

In detail, the word recognition block 9 compares the first order of candidate of phoneme input from the phoneme recognition block 7 with each phoneme of the reference string of phonemes stored in a first memory area, registered as No. 1 and calculates the number of branches according to the matching technique shown in FIGS. 2 and 3, the counted number of branches being stored therein.

For example, if the first phoneme of the reference string of phonemes coincides with the first phoneme of the first order of string of phonemes derived from the phoneme recognition block 7, the number of branches is counted as 1 as appreciated from FIG. 2.

Then, if the third phoneme of the reference string of phonemes does not coincide with the third phoneme of the compared string of phonemes but coincides with the fourth phoneme of the compared string of phonemes, the number of branches A when the present order of phonemes is compared with the corresponding order of phonemes of the string of phonemes derived from the phoneme recognition block 7 is counted as A=B+1 as appreciated from FIG. 3, wherein B denotes the number of branches until the adjacent prior phoneme of the reference string of phonemes coincides with the corresponding adjacent prior phoneme of the string of phonemes input from the phoneme recognition block 7.

In this way, each order of the reference string of phonemes is compared with a corresponding order of the string of phonemes to determine a preparation of one branch.

On the other hand, if any one of the orders of the string of phonemes derived from the phoneme recognition block neither coincides with the corresponding order of the phonemes nor with the adjacent of the orders of the reference string of phonemes as shown in FIG. 3, the number of branches C is derived as C=max (D, E), wherein D and E denotes vertexes of respective rectangle most adjacent to a vertex C by which a rectangle is formed with both vertexes of the corresponding order of phonemes.

Referring back to the technique of the number of branches, the number of branches can be derived as described above, normally;

if A [i]=B [j], S[i][j]=S [i−1][j−1]+1, else S [i][j]=MAX (S[i−1][j], S[i][j−1]), wherein MAX (D, E) denotes a larger value D or E selected from among values of D and E, A [i]: i=1 to I denotes the reference string of phonemes and B [j]: j=1 to J denotes any order of candidates, i.e., one of the strings of phonemes input from the phoneme recognition block 7.

In this way, the total counted number of branches S[I][J] are temporarily stored in a register of the word recognition block 9. Thereafter, the similarity on the above-described strings of the phonemes is calculated as described above, i.e., N/LA+N/LB, wherein N denotes S[I][J], LA denotes the length of the string of phonemes A[i]:i=1 to I, and LA denotes the length of B[j]:j=1 to J.

Whenever the similarity is derived, the value of similarity is temporarily stored in a register of the word recognition block 9.

In this way, the word recognition block 9 repeats the comparison and derivation of each similarity until the first candidate of the string of phonemes is compared with the reference string of phonemes stored in the first memory area of the dictionary 8 and the n-th order of candidates of phonemes of the string of phonemes is compared with the reference string of phonemes stored in an n-th number memory area of the dictionary 8.

Then, the word recognition block 9 outputs the result of word recognition, i.e., at least one candidate of words registered in any number of memory areas of the dictionary 8 whose reference string of phonemes has the highest similarity to any one of the strings of the phonemes derived from the phoneme recognition block 7 to the output block 10.

It is, however, noted that the difference from the previously proposed technique is present in the phoneme recognition block 7, frame unit dictionary 8, and word recognition block 9.

That is to say, 1) the reference strings of phonemes stored in the frame unit dictionary 8 are expressed on the frame form bases, i.e., each reference string of phonemes such as denoted by A[i]:i=1 to I (aaaabbbc shown in FIG. 3) The continued length of each phoneme is derived by averaging speech data of a corresponding word uttered actually from a specified person and the prepared and stored strings of phonemes for each word are determined on the basis of the average continued length for the respective phonemes previously derived and/or on the basis of a table representing a general average length of each phoneme.

In addition, (2) although, in the previous technique, the word recognition block compares only the single string of phonemes derived from the phoneme recognition block as the first order of candidate, i.e., only a single candidate with the reference string of phonemes stored in the segment unit dictionary, the word recognition block 9 can determine that the matching can be made, i.e., the highest similarity can be obtained if one of the strings of phonemes from the first order to the n order derived from the phoneme recognition block is the same as that stored in the frame unit dictionary. Until which order the strings of the phonemes are used as the candidates in the phoneme recognition block is empirically determined with a rate of recognition at the phoneme recognition and a rate of final word recognition taken into consideration.

In the technique used in the speech recognition system in the first preferred embodiment according to the present invention, as the outputs of the phoneme recognition block 7, the plurality of strings of phonemes can be used up to the n-th order of candidates. Thus, the word recognition block 9 can retrieve the outputs of the phoneme recognition block 7 with the linguistic information (in the preferred embodiment, the information of phoneme linkage within a single word) taken into consideration. Consequently, a more accurate recognition of the word uttered by any unspecified person can be made. In addition, since it is not necessary for the phoneme recognition block to convert the frame expressed string of phonemes to the segment expressed string of phonemes, no defect of the linguistic information when the conversion to the segment expressed string of phonemes in the compression block is carried out occurs.

Second Embodiment

Next, a previously proposed Dynamic Time-Warping (DP, or DTW) matching method will be described with reference to FIG. 4 before explanation of the speech recognition system in a second preferred embodiment according to the present invention.

The DTW method is a kind of a time alignment method applicable to the phoneme recognition of the speech recognition method and system to cope with a difference in length of utterance according to the individual personalities of the unspecified persons.

Figure 4:
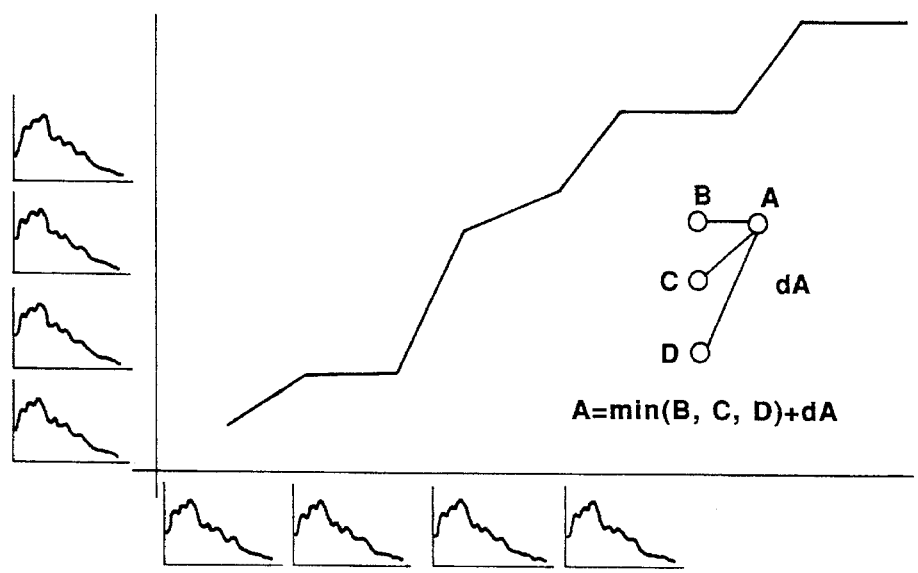
FIG. 4 is an example of a DTW calculation for explaining a word recognition in another previously proposed speaker independent speech recognition system when comparing an input pattern of time-series power spectra (multidimensional vectors) with a reference pattern of time-series power spectra stored in a dictionary of the other previously proposed speech recognition system.

The speech recognition by means of the DTW technique is such that a distance between a series of characteristic vectors extracted by means of the FT analyzer 5 and corresponding characteristic vectors (so-called template) of each word to be recognized at each time is derived from a two dimensional matrix shown in FIG. 4 and a path from a start point to an end point is selected from paths limited such as to provide a shortest accumulation of the distances and a word which provides a shortest accumulated distance is output as the word recognition (refer to FIG. 4).

A solid line denoted in FIG. 4 represents the path derived by a collection of A (A=min (B, C, D)+dA, wherein dA denotes a distance of a point of A of the path itself and represents a warping function.

It is noted that the previously proposed DTW technique shown in FIG. 4 is exemplified by a Japanese book titled "Pattern Recognition" published by the Japanese Society of Electronic, Information, and Communication on Apr. 26, 1993 (pages 117 to 119).

That is to say, suppose that a correspondence between a reference pattern in the time series (longitudinal axis of FIG. 4) and an input pattern in the time series (lateral axis of FIG. 4) is carried out. Then, a route passing through a point (lattice point) of an intersection of each frame and connecting most adjacent point of intersection as a total may be searched. To search the route, an accumulated value of distances of total interframes is needed to be minimized. Then, a word which provides the minimized accumulated value of the total distances can be selected to determine the input word uttered by a person.

It is noted that since the length of the reference pattern (i.e., a number of frames) is different dependent upon each word, it is necessary for the interframe distance between frames not to depend on the length described above.

Then, the interframe distance $d(i, j)$ (=$d(x_i, a_j)$) is derived using an Euclidean distance or so on, the reference pattern of a certain word being denoted by A (=$\{a_1, a_2, ---, a_i, --- a_J\}$) and the input pattern being denoted by X (=$\{x_1, x_2, ---, x_i, ---, x_I\}$).

$d(i, j) = \|x_i - a_j\|^2$, wherein $\| \|$ denotes a norm of a vector.

Next, the correspondence of the whole patterns is calculated as follows:

$$D(X,A) = \min_{F} \left\{ \sum_{k=1}^{K} d(c(k)) \cdot \omega(k) / \Sigma\omega(k) \right\}$$

In the above equation, F denotes a point matrix of a route expressed as $F=\{c(1), c(2), ---, c(K)\}$, wherein $c(k)=(i, j)$.

Then, if a denominator of the above equation $\Sigma\omega(k)$ cannot be dependent upon F, suppose $N=\Sigma\omega(k)$.

$$D(X,A) = (1/N) \min_{F} \sum_{k=1}^{K} d(c(k)) \cdot \omega(k)$$

Therefore, a part of the above equation becomes additive and the DTW technique can be applied.

In the above equations, min denotes an operation to derive a minimum value on the correspondences of various routes from a lattice point (1, 1) to the final lattice point (I, J) and $\Sigma\omega(k)$ denotes a weight set according to the kinds of the routes.

As a method of making the term N independent of the routes, the following limitations are set.

a) an example of slope limitations, a symmetrical type:

$\Sigma\omega(k)=(i(k)-i(k-1)+(j(k)-j(k-1)), N=I+J.$ b) another example of slope limitations, an asymmetrical type:

$\Sigma\omega(k)=|i(k)-i (k-1)|, 0\leq|i(k)-i(k-1)|\leq 2, N=I.$

Such limitations as described above are called slope limitations.

FIG. 4 shows the example of the slope limitations of the asymmetrical type.

Although the slope limitations are made in the symmetrical type and the input pattern and reference pattern are exchanged together, such a case as $D(X, A)\neq D(A, X)$ would occur so that the symmetry in the distances cannot be satisfied but a substantial problem does not occur.

A specific calculation method on the slope limitations of the symmetrical type is as follows:

$g(C(k))=\min \{g(c(k-1)+d(c(k))\cdot\Sigma\omega(k)\}$

That is to say, in the case of the symmetrical type, $$g(i,j) = \min \begin{cases} g(i,j-1) + d(i,j) \\ g(i-1,j-1) + 2d(i,j) \\ g(i-1m,j) + d(i,j) \end{cases}$$

The above equation represents a recurrence formula and is calculated under an initial value of $g(1, 1)=2d(1, 1)$. In addition, a matching window described below needs to be set to avoid extreme correspondence: $|i(k)-j(k)|\leq r$. Finally, the time alignment distance can be derived as D $(X<A)=g(I, J)/(I+J)$ so that a word which provides a minimum distance is selected to derive the result of recognition.

However, the above-described method of previous DTW has drawbacks as described below:

1) It takes much time to calculate the distance of the respective multidimensional characteristic vectors at the respective times.

2) An actual speech data is necessary to prepare the templates and, when some vocabularies are modified, it becomes necessary to again collect the speech data.

3) If the previous DTW technique is applied to the speech recognition system previously proposed i.e., to the speaker independent speech recognition system, it becomes necessary to have a plurality of templates per word in order to trap variations in time and to absorb the characteristic vector variations so that the large templates are needed.

It is noted that the structure of the second preferred embodiment is the same as that of the above-described first embodiment shown in FIG. 1.

That is to say, in FIG. 1, the power spectra block transmits the characteristic vectors (strings of power spectra with respect to respective phonemes) for the respective time points to the phoneme recognition block 7.

Figure 5:
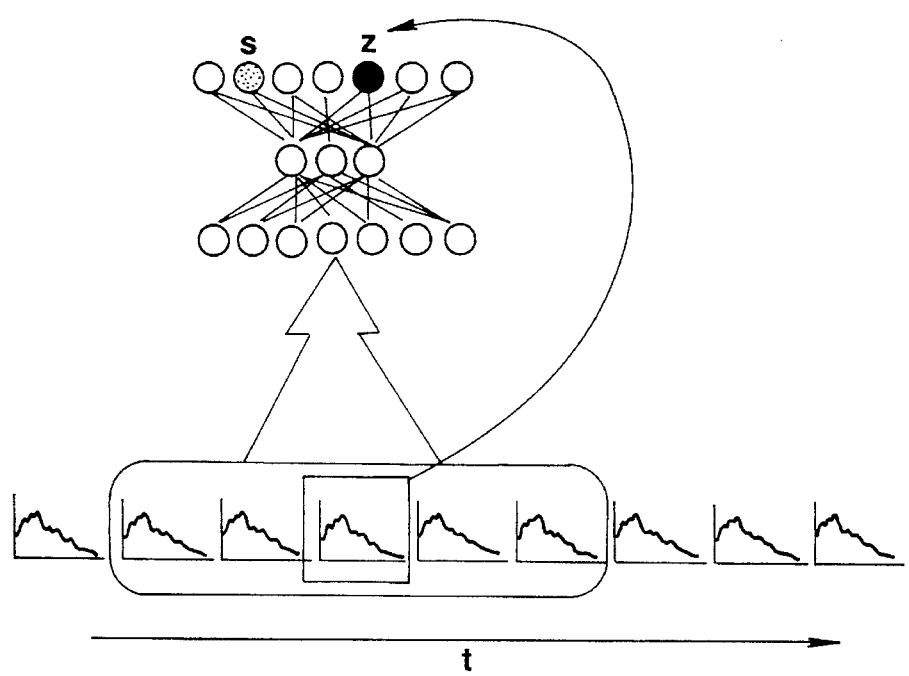
FIG. 5 is an example of back-propagation earning parallel run Neural Networks used in a second preferred embodiment of the speech recognition system for explaining a phoneme candidate for five frames of multidimensional characteristic vectors.

The phoneme recognition block 7 is constituted by the Neural Network and receives and allows a collected package of five frame characteristic vectors once per package to enter sequentially each characteristic vector per frame. Then, the phoneme recognition block 7 outputs which category the center of each frame corresponds to. At the output thereof, the result of phoneme recognition of the first order and second order is output to the word recognition block 9 as shown in FIG. 5.

The word recognition block 9 carries out the calculation by means of DTW technique between the templates and results of phoneme recognition. It is noted that the template for each word is not expressed in the characteristic vector but expressed such that the phonemes constituting the word are expressed as in the form of the string of phonemes. The length of each phoneme is determined a) by averaging an actual word data or b) on the basis of a table representing a general average length of each phoneme as described in the first embodiment.

A final expression of each word is such that, e.g., for the word "zero (0)", the expression of the single template is "zzzeeeeerroooo".

In a normal(or previously proposed) DTW technique, the comparison between the template and input phoneme is carried out such that the accumulation of the distances of the respective characteristic vectors which are minimized is advanced and the result of phoneme recognition is in the descending order in which the finally accumulated distances are shortest.

In the second preferred embodiment, the distance at each time point between the input pattern and reference pattern is determined by the following conditions:

1) If one of the phoneme of the template coincides with the corresponding-order phoneme of input data, the distance is supposed to be 0.

2) If the one phoneme does not coincide but the second-order candidate coincides with the corresponding order of phoneme of the template, the distance is supposed to be 1.

3) Otherwise, the distance is supposed to be 2.

The other calculations are carried out in the same way as the previous DTW technique. Thus, the accumulated distances are derived for all words in the templates and then the word recognition block 9 outputs the word in which the accumulated distances are minimized as the result of word recognition.

Table 1 indicates an example of the DTW matching technique, executed in the second embodiment, which satisfies the conditions of the items of 1), 2), and 3) and prepared paths denoted by the series of solid lines. In Table 1, a lateral axis denotes one time series reference string of the word zero and a longitudinal axis denotes a plurality of candidates of phonemes derived from the phoneme recognition block 7.

TABLE 1

| | | | | | | | | | | | | | | | |
|---|---|---|---|---|---|---|---|---|---|---|---|---|---|---|---|
| ao | 2 | 2 | 2 | 2 | 2 | 2 | 2 | 2 | 2 | 2 | 0 | 0 | 0 | 0 | 0 |
| oa | 2 | 2 | 2 | 2 | 2 | 2 | 2 | 2 | 2 | 2 | 1 | 1 | 1 | 1 | 1 |
| ao | 2 | 2 | 2 | 2 | 2 | 2 | 2 | 2 | 2 | 2 | 0 | 0 | 0 | 0 | 0 |
| ao | 2 | 2 | 2 | 2 | 2 | 2 | 2 | 2 | 2 | 2 | 0 | 0 | 0 | 0 | 0 |
| or | 2 | 2 | 2 | 2 | 2 | 2 | 2 | 0 | 0 | 1 | 1 | 1 | 1 | 1 | 1 |
| or | 2 | 2 | 2 | 2 | 2 | 2 | 2 | 0 | 0 | 1 | 1 | 1 | 1 | 1 | 1 |
| ra | 2 | 2 | 2 | 2 | 2 | 2 | 2 | 1 | 1 | 2 | 2 | 2 | 2 | 2 | 2 |
| ro | 2 | 2 | 2 | 2 | 2 | 2 | 2 | 1 | 1 | 0 | 0 | 0 | 0 | 0 | 0 |
| oe | 2 | 2 | 2 | 0 | 0 | 0 | 0 | 2 | 2 | 1 | 1 | 1 | 1 | 1 | 1 |
| ie | 2 | 2 | 2 | 0 | 0 | 0 | 0 | 2 | 2 | 2 | 2 | 2 | 2 | 2 | 2 |
| ie | 2 | 2 | 2 | 0 | 0 | 0 | 0 | 2 | 2 | 2 | 2 | 2 | 2 | 2 | 2 |
| ei | 2 | 2 | 2 | 2 | 1 | 1 | 1 | 1 | 2 | 2 | 2 | 2 | 2 | 2 | 2 |
| ei | 2 | 2 | 2 | 2 | 1 | 1 | 1 | 1 | 2 | 2 | 2 | 2 | 2 | 2 | 2 |
| sz | 0 | 0 | 0 | 0 | 2 | 2 | 2 | 2 | 2 | 2 | 2 | 2 | 2 | 2 | 2 |
| sz | 0 | 0 | 0 | 0 | 2 | 2 | 2 | 2 | 2 | 2 | 2 | 2 | 2 | 2 | 2 |
| zs | 1 | 1 | 1 | 1 | 2 | 2 | 2 | 2 | 2 | 2 | 2 | 2 | 2 | 2 | 2 |
| zs | 1 | 1 | 1 | 1 | 2 | 2 | 2 | 2 | 2 | 2 | 2 | 2 | 2 | 2 | 2 |
| | z | z | z | z | e | e | e | e | r | r | o | o | o | o | o |

EXAMPLE 1

The speaker independent isolated word speech recognition system has been developed. The phoneme recognition block 7 is constituted by a type of Neural Networks and the word recognition block 9 uses the time alignment matching technique by means of the DTW. Thus, for 63 words vocabularies including considerably high similarity words, the rate of recognition in the case of 15 specified persons indicated 97. 95% and that in the case of 5 persons except the 15 specified persons indicated 97. 97%.

As the vocabularies subjected to undertake the word recognition, 63 words were set, the words being used for a power plant monitoring purpose. In addition, as an input of word utterance, a telephone circuit was used with a general availability taken into full consideration.

As described above, the 63 numbers of words were set with the application of the speech recognition to the power plant monitoring taken into consideration. These words were divided into group 1 (group 1: 28 words), i.e., experimental words during the architecturing of the speech recognition system and group 2 (group 2: 35 words), i.e., practically selected words from actual vocabularies.

Table 2 indicates the listing of the used vocabularies (63 words).

In Table 2, 1 through 63 of the right column denotes respective numbers of words, in other words, No. of the memory areas in the dictionary 8. An intermediate column denotes word (Japanese) and the left column denotes each phonemes corresponding to the word written in the intermediate column. It is noted that in Table 2 the words from word No. 1 to word No. 28 belong to the group 1 and the words from word No. 29 to word No. 63 belong to the group 2.

In Table 2, 番号 is translated as No., 単語 is translated as words, 音素 is translated as phoneme, 投入 is translated as turn on, 開放 is translated as open, 監視 is translated as monitoring, 試験 is translated as test, 素通しis translated as passing without examination, 東京 to 秋葉are names of districts in Tokyo, 号 is translated as No., の is a conjunction, 母線 is translated as bus line, 所変 is translated as subsidiary station, 主変 is translated as main station, CB is translated as circuit breaker, キャリアリレー translated as carried relay, and so on.

TABLE 2

| 番号 | 単語 | 音素 |
| --- | --- | --- |
| 1 | 投入 | tonyu |
| 2 | 開放 | kaiho |
| 3 | 監視 | kaxsi |
| 4 | 試験 | si-kex |
| 5 | 素通し | su-dosi |
| 6 | 素通し解除 | su-dosi-kaizyo |
| 7 | 0 | zero |
| 8 | 1 | i-ti |
| 9 | 2 | ni |
| 10 | 3 | sax |
| 11 | 4 | yox |
| 12 | 5 | go |
| 13 | 6 | ro-ku |
| 14 | 7 | nana |
| 15 | 8 | ha-ti |
| 16 | 9 | kyu |
| 17 | 東京 | to-kyo |
| 18 | 有楽町 | yura-ku-tyo |
| 19 | 品川 | sina-gawa |
| 20 | 五反田 | go-tax-da |
| 21 | 渋谷 | si-buya |
| 22 | 新宿 | sixnyu-ku |
| 23 | 目白 | meziro |
| 24 | 日暮里 | ni-pori |
| 25 | 上野 | ueno |
| 26 | 秋葉原 | a-kiha-bara |
| 27 | 号 | go |
| 28 | の | no |
| 29 | 東京線 | to-kyosex |
| 30 | 名古屋線 | na-goyasex |
| 31 | 大阪線 | osa-kasex |
| 32 | 京都線 | kyo-tosex |
| 33 | 線路 | sexro |
| 34 | 母線 | bosex |
| 35 | 所変 | syohex |
| 36 | 主変 | syuhen |
| 37 | CB | si-bi |
| 38 | キャリアリレー | kyariyarire |
| 39 | ブスタイ | busu-tai |
| 40 | スタコン | suta-kox |
| 41 | LA | erue |
| 42 | 主 | syu |
| 43 | O | o |
| 44 | 甲 | ko |
| 45 | 乙 | o-tu |
| 46 | # | i-ga-ta |
| 47 | ユニット | yuni-to |

TABLE 2-continued

| 番号 | 単語 | 音素 |
| --- | --- | --- |
| 48 | 次 | zi |
| 49 | 群 | gux |
| 50 | 以降 | i-ko |
| 51 | A | e |
| 52 | 10 | zyu |
| 53 | 500 | gohya-ku |
| 54 | KV | kiro-buru-to |
| 55 | 1号 | i-ti-go |
| 56 | 2号 | ni-go |
| 57 | 3号 | sax-go |
| 58 | 1次 | i-tizi |
| 59 | 2次 | nizi |
| 60 | 3次 | sax-zi |
| 61 | 主1 | syui-ti |
| 62 | 主2 | syuni |
| 63 | 交互 | ko-go |

The digital speech data was converted into 27 mel-spectra. The phoneme recognition block 7 shifted in terms of time the converted power spectra by one frame, retrieved five frames of the converted power spectra, and outputted two phonemes belonging to the 21 kinds of phonemes as a first candidate and a second candidate.

The word recognition block 9 compared the first candidate and second candidate from the phoneme recognition block 7 with the previously prepared words from the dictionary 8 by means of the DTW technique and outputted first highest similarity word, second highest similarity word, and third highest similarity word as the result of word recognition to the output block 10.

In details, a speech uttered by a person which was electrically converted signal by means of a telephone 1 and 2 was converted into the 27 mel-spectra. That is to say, the 20 voice uttered by the person which was retrieved by the telephone 1 and 2 was sampled by means of the A/D converter 3 into 16 bit digital signal at the sampling rate of 8 KHz. The sampled data was transformed by means of the Hamming window function generator 4 having a window shift width of 12 ms and by means of the FT analyzer 5 into 27 mel-spectra which was input to the phoneme recognition block 7.

The phoneme recognition block 7 was constituted by the back-propagation learning type Neural Networks shown in FIG. 5. An output function of the unit (Neural Networks) was not a normal sigmoid function but used tanh as expressed: y=tanh (⅔*x).

The input layer of the Neural Network shown in FIG. 5 normalized the 27 mel-spectra into values from −1 to 1 and, thereafter, inputs simultaneously time continued five frames. On the other hand, the output layer outputted values from −1 to 1 of the unit allocated to which phoneme from among 21 phonemes the center frame of the five input frames corresponded. The determination of candidates was such that as the result of phoneme recognition, first and second candidates were output in the form of phoneme codes from a maximum value of all output layers. The number of units shown in FIG. 5 were 27*5=135 for the input layer, 21 for the output layer, and 120 for the intermediate (hidden) layer.

Next, Table 3 indicates the result of learning when the above-described learning data (89, 354 vectors) were given and 100 epoch learnings were conducted. The earning duration in time was about one hour ten minutes. The rate of recognition was derived by deriving the rates of recognitions for the respective phonemes and averaging the rates of recognitions derived as described above. The test data were used from all data uttered twice for the 63 words by 5 speakers except 15 speakers used for the learning.

TABLE 3

| learning data | test data |
| --- | --- |
| 85.60% | 70.71% |

Next, the word recognition block 9 calculates the accumulated value of distances between the string of phonemes derived from the phoneme recognition block 7 described above with the reference string of phonemes using the DTW techinique described above under the conditions of 1) to 3) described above.

The word recognition block 9, in detail, calculated the accumulated distances g(i, j) up to a time i of the input pattern time series derived from the phoneme recognition block 7 described above and up to a time j of the reference pattern time series using recursively the intervector distance d(i, j) between one input vector at the time i and one reference vector at the time j.

The calculation of the accumulated distances were the same as those shown in FIG. 4.

In this case, g(i,j)=min {g(i−1, j), g(i−1, j), g(i−1, j−2)}+ d(i, j).

In the word recognition block 9, the DTW technique with the conditions of determinations of distances 1) to 3) was used. The reference pattern stored in the dictionary was experimentally determined by averaging the continued lengths of time for the respective phonemes of each word derived from phoneme labels of the data on the twice utterances of 63 words by 20 speakers.

Tables 4 (A) and 4 (B) indicate the results of word recognitions actually carried out by the word recognition block.

TABLE 4(A)

| | learning speaker | | |
| --- | --- | --- | --- |
| 語い | 学習音声 | テスト発声 | 全発声 |
| 28 | 99.88% | 99.44% | 99.62% |
| 35 | 98.67% | 98.10% | 98.32% |
| 63 | 98.41% | 97.64% | 97.95% |

In Table 4(A), 語い is translated as vocabularies, 学習音声 is translated as learning utterance, テスト発声 is translated as tested utterance, and 全発声 is translated as whole utternace.

TABLE 4(B)

| | tested speaker | | |
| --- | --- | --- | --- |
| 語い | 学習音声 | テスト発声 | 全発声 |
| 28 | 99.29% | 99.52% | 99.43% |
| 35 | 99.05% | 99.05% | 98.86% |
| 63 | 97.46% | 98.31% | 97.97% |

In the vocabularies 28 of Tables 4 (A) and 4 (B), candidates to be recognized were selected from only the group 1 of Table 2, in the vocabularies 35 of Tables 6 (A) and 6 (B), candidates to be recognized were selected from only the group 2 of Table 2. In addition, the learning speaker recited in Tables 4 (A) and 4 (B) was 15 speakers used to train the Neural Networks of the phoneme recognition block 7 and the tested speaker was 5 speakers except 15 speakers used to train the Neural Networks described above. The learning utterance data indicated twice utterance data used in the training of the Neural Networks. The tested utterance data indicated third, fourth and fifth utterance data uttered otherwise. The same score was deemed to be the correct answer when deriving the rate of recognition.

Effects of the invention

It is noted that a word processing block 11 shown in FIG. 1 is, for example, constituted by a control apparatus of the power plant which controls an operating variable in accordance with the word recognized by the speech recognition system shown in FIG. 1.

However, the speech recognition system according to the present invention can be applied to every control apparatus which is operated in accordance with the speech data derived from the speech recognition system.

U.S. Pat. No. 4,637,045 exemplifies the application of the speech recognition system to an automotive vehicle.

As described hereinabove, since, in the speech recognition system according to the present invention, the input pattern of the string of phonemes can be prepared in a plurality of candidates from the phoneme recognition block and can directly be compared with the reference pattern expressed in the string of the phonemes, the rate of word recognition for all speech data can remarkably be increased and the calculation speed can be faster.

It will fully be appreciated by those skilled in the art that the foregoing description has been made to the preferred embodiment and various changes and modifications may be made without departing from the scope of the present invention which is to be defined by the appended claims.

What is claimed is:

1. A speaker independent apparatus for word recognition comprising:

a) input means for inputting an utterance by an unspecified person into an electrical signal;

b) characteristic extracting means for receiving the electrical signal from the input means and converting the electrical signal into a time series of discrete characteristic multidimensional vectors;

c) phoneme recognition means for selectively receiving the time series of discrete characteristic multidimensional vectors and converting each of said selectively received vectors into a plurality of candidates of phonemes from a first order to an n-th order (n denotes an arbitrary number);

d) word recognition means for receiving a time series string of phonemes from the phoneme recognition means and comparing the plurality of candidates of phonemes, one at a time, with each phoneme of a reference string of phonemes for words previously stored in a dictionary until a final phoneme of the reference string of phonemes for a last word of the words stored in the dictionary and determining a time series of phonemes derived from said phoneme recognition means having a highest similarity to one of the reference strings of the phonemes for the words stored in the dictionary using a predetermined word matching technique;

e) output means for outputting at least one of said candidates of phonemes as a result of word recognition carried out by the word recognition means on the basis of a similarity determination on the plurality of candidates of phonemes with respect to the reference strings of the words stored in said dictionary; and f) selecting means, interposed between said characteristic extracting means and phoneme recognition means, for selecting a center of a given number of frames of a continued time-series of discrete characteristic multidimensional vectors derived from said characteristic extracting means so that said phoneme recognition means receives the center thereof.

2. An apparatus as set forth in claim 1, wherein said word recognition means for determining the time series of strings of phonemes derived from said phoneme recognition means has a totally similarity to the time series reference string of phonemes for each word depending upon a distance from one of the plurality of candidates of the phonemes to one of the phonemes of the reference string of the phonemes in a two-dimensional coordinate matrix and wherein said output means outputs a plurality of word candidates as the result of word recognition according to a derived distance, a first order of the plurality of word candidates being the word having the reference string of phonemes with a smallest distance to the candidates of the time series of phonemes derived from said phoneme recognition means.

3. An apparatus as set forth in claim 1, wherein said predetermined word matching technique, of said word recognition means, is a Dynamic Time Warping (DTW) technique, having an accumulated distance $g(i, j)$ from a time i of the input string of phonemes in the time series to a time j of the reference string of phonemes stored in one of memory areas of the dictionary and calculated using an intervector distance $d(i, j)$ from one of the phonemes of the input string of the phonemes at the item i to one of the phonemes of the reference string of phonemes at the time j; $g(i, j)=\min \{g(i-1, j), g(i-1, j-1), g(i-1, j-2)\}+d(i, j)$, such that 1) if one of the phonemes of the reference string of the phonemes coincides with a corresponding order one of the phonemes of the input string of the phonemes of the first order of candidates, the intervector distance is 0; 2) if one of the phonemes of the reference string of phonemes does not coincide with the corresponding order of the phonemes of the input string of the phonemes of the first order of the candidates but coincides with the corresponding order phoneme of the phonemes of a second order of candidates, the intervector distance is 1; and 3) in other cases, the intervector distance is 2, at least one path minimizing the accumulated distance is prepared, and a minimum path is derived from the paths prepared for each reference string of phonemes constituting the respective words, the word having the reference string of phonemes with the minimum path to the corresponding input string of the phonemes being output as the result of word recognition.

4. An apparatus as set forth in claim 1, wherein said phoneme recognition means includes back-propagation type parallel run Neural Networks.

5. An apparatus as set forth in claim 4, wherein said Neural Networks retrieve five frames of the time series of the characteristic vectors from said characteristic extraction means to input layers thereof, shifts the five frames by one frame, and outputs at least one phoneme corresponding to a center frame of the input five frames of the time series characteristic vectors from output layers thereof.

6. An apparatus as set forth in claim 5, wherein said Neural Networks comprise 135 input layers, 21 output layers, and 120 hidden layers.

7. An apparatus as set forth in claim 6, wherein said output means outputs the result of word recognition in the form of encoded data of the words.

8. An apparatus as set forth in claim 7, wherein the result of word recognition in the form of the encoded data from said output means is used to control a power plant.

9. An apparatus as set forth in claim 1, wherein in said predetermined word matching technique, of said word recognition means, a number of branches $S\{I\}\{J\}$ is determined under such a condition that (1) two branches are not intersected across each other and (2) only one branch can be drawn from each of phonemes when one of the plurality of the phonemes derived from the phoneme recognition means is compared with one of the reference strings of phonemes for the respective words in such a way as: if $A\{i\}=B\{j\}$, $S\{i\}\{j\}=S\{i-1\}\{j-1\}+1$ else $S\{i\}\{j\}=\max(S\{i-1\}\{j\}, S\{i\}\{j-1\})$, wherein $A\{i\}$ denotes either of the string of phonemes $A\{i\}$: i=1 to I derived from the phoneme recognition means or retrieved from the dictionary and $B\{j\}$ denotes the other string of phonemes to be compared $B\{j\}$: j=1 to J and a maximum number of branches N is derived from among $S\{I\}\{J\}$ and a magnitude of similarity is derived as $N/LA+N/LB$, wherein LA denotes a length of the string of phonemes $A\{i\}$: i=1 to I and LB denotes a length of the string of phonemes $B\{j\}$: j=1 to J, the magnitude of similarity being derived until a final order of candidates from the phoneme recognition means is compared with a final reference string of the word stored in a memory area of the dictionary.

10. A method of speaker independent speech recognition comprising the steps of:

a) inputting an utterance by an unspecified person into an electrical signal;

b) receiving the electrical signal from the input means and converting the electrical signal into a time series of discrete characteristic multidimensional vectors;

c) receiving the time series of discrete characteristic multidimensional vectors and converting each of said vectors into a plurality of candidates of phonemes from a first order to an n-th order (n denotes an arbitrary number);

d) receiving a time series strings of phonemes derived at said step c) and comparing the plurality of candidates of phonemes, one at a time, with each phoneme of a reference string of phonemes for each word previously stored in a dictionary until a final phoneme of the reference string of phonemes for a last word of the words stored in the dictionary and determining which time series of phonemes derived at said step c) has totally highest similarity to one of the reference strings of the phonemes for the respective words stored in the dictionary using a predetermined word matching technique;

e) outputting at least one word candidate as a result of word recognition carried out at said step d) on the basis of the similarity determination on the plurality of candidates of phonemes 11. A speaker independent apparatus for word recognition comprising:

a) input means for inputting an utterance by an unspecified person into an electrical signal;

b) characteristic extracting means for receiving the electrical signal from said input means and converting the electrical signal into a time series of discrete characteristic multidimensional vectors;

c) phoneme recognition means for selectively receiving the time series of discrete characteristic multidimensional vectors and converting each of said selectively received vectors into a plurality of candidates of phonemes from a first order to an n-th order (n denotes an arbitrary integer exceeding 1), said phoneme recognition means including selecting means for selecting a center of a given number of frames of a continued time-series of discrete characteristic multidimensional vectors derived from said characteristic extracting means so as to receive the center thereof;

d) storing means for storing a plurality of reference data of words as a dictionary;

e) word recognition means for receiving a time series string of phonemes from the phoneme recognition means and comparing the plurality of candidates of phonemes, one at a time, with each phoneme of a reference string of phonemes for a last word of the words stored in the dictionary and determining a time series of phonemes derived from said phoneme recognition means having a highest similarity to one of the reference strings of the phonemes for the words stored in the dictionary using a special word matching technique; and f) output means for outputting at least one of said candidates of phonemes as the result of word recognition carried out by the word recognition means on the basis of a similarity determination on the plurality of candidates of phonemes with respect to the reference strings of the words stored in the dictionary, wherein said word recognition means determines a time series of strings of phonemes derived from said phoneme recognition means having a highest similarity to the time series reference string of phonemes for each word depending upon a distance from one of the plurality of candidates of the phonemes in a two-dimensional coordinate matrix, wherein said output means outputs a plurality of word candidates as the result of word recognition according to a derived distance, a first order of the plurality of word candidates being the word having the reference string of phonemes with a smallest distance to the candidates of the time series of phonemes derived from said phoneme recognition means, and wherein said special word matching technique being such that a number of branches $S\{I\}\{J\}$ is determined under such a condition that two branches are not intersected across each other and (2) only one branch can be drawn from each of phonemes when one of the plurality of the phonemes derived from said phoneme recognition means is compared with one of the reference strings of phonemes for the respective words in such a way as: if $A\{i\}=B\{j\}$, $S\{i-1\}\{j-1\}+1$ else $S\{i\}\{j\}=\max(S\{i-1\}\{j\}, S\{i\}\{j-1\})$, wherein max denotes either larger one of $S\{i-1\}\{j\}$ or $S\{i\}\{j-1\}$, $A\{i\}$ denotes either of the strings of phonemes $A\{i\}$: i=I derived from the phoneme recognition means or retrieved from the dictionary and $B\{j\}$ denotes the other string of phonemes to be compared $B\{j\}$: j=i to J, and a maximum number of branches N is derived from among $S\{I\}\{J\}$ and a magnitude of similarity is derived as N/LA+N/LB, wherein LA denotes a length of the string of phonemes $B\{j\}$: j=1 to J, the magnitude of similarity being derived until a final order of candidates from the phoneme recognition means is compared with a final reference string of the word stored in a memory area of the dictionary. with respect to the reference strings of the words stored in said dictionary; and f) selecting a center of a given number of frames of a continued time-series of discrete characteristic multidimensional vectors derived from said step b) so that the center of the frames is received in said step c).

* * * * *